United States Patent
Jin et al.

(10) Patent No.: US 10,349,058 B2
(45) Date of Patent: Jul. 9, 2019

(54) METHOD FOR PREDICTING DEPTH MAP CODING DISTORTION OF TWO-DIMENSIONAL FREE VIEWPOINT VIDEO

(71) Applicant: Graduate School at Shenzhen, Tsinghua University, Shenzhen, Guangdong (CN)

(72) Inventors: Xin Jin, Guangdong (CN); Chenyang Li, Guangdong (CN); Qionghai Dai, Guangdong (CN)

(73) Assignee: GRADUATE SCHOOL AT SHENZHEN, TSINGHUA UNIVERSITY, Shenzhen, Guangdong (CN)

( * ) Notice: Subject to any disclaimer, the term of this patent is extended or adjusted under 35 U.S.C. 154(b) by 188 days.

(21) Appl. No.: 15/660,476

(22) Filed: Jul. 26, 2017

(65) Prior Publication Data

US 2017/0324961 A1 Nov. 9, 2017

Related U.S. Application Data

(63) Continuation of application No. PCT/CN2015/099210, filed on Dec. 28, 2015.

(30) Foreign Application Priority Data

Jan. 26, 2015 (CN) .......................... 2015 1 0039515

(51) Int. Cl.
*H04N 13/194* (2018.01)
*H04N 13/271* (2018.01)
(Continued)

(52) U.S. Cl.
CPC ......... *H04N 19/147* (2014.11); *H04N 13/194* (2018.05); *H04N 13/271* (2018.05);
(Continued)

(58) Field of Classification Search
None
See application file for complete search history.

(56) References Cited

U.S. PATENT DOCUMENTS

| 2010/0290715 A1* | 11/2010 | Kimata | ..................... G06T 5/50 382/300 |
| 2013/0321574 A1* | 12/2013 | Zhang | .................. H04N 19/597 348/43 |
| 2014/0340478 A1* | 11/2014 | Kwong | ................ H04N 19/597 348/43 |

FOREIGN PATENT DOCUMENTS

| CN | 103402097 | 11/2013 |
| CN | 103402097 A * | 11/2013 |

(Continued)

OTHER PUBLICATIONS

International Search Report issued for Serial No. PCT/CN2015/099210, dated Mar. 31, 2016, English translation, 5 pages.

*Primary Examiner* — Xiaolan Xu
(74) *Attorney, Agent, or Firm* — Hamre, Schumann, Mueller & Larson, P.C.

(57) ABSTRACT

Disclosed is a method for predicting depth map coding distortion of a two-dimensional free viewpoint video, including: inputting sequences of texture maps and depth maps of two or more viewpoint stereoscopic videos; synthesizing a texture map of a first intermediate viewpoint of a current to-be-coded viewpoint and a first adjacent viewpoint, and synthesizing a texture map of a second intermediate viewpoint of the current to-be-coded viewpoint and a second adjacent viewpoint by using a view synthesis algorithm; recording a synthetic characteristic of each pixel according to the texture map and generating a distortion prediction weight; and calculating to obtain total distortion according to the synthetic characteristic and the distortion prediction weight.

6 Claims, 1 Drawing Sheet

(51) Int. Cl.
*H04N 19/105* (2014.01)
*H04N 19/147* (2014.01)
*H04N 19/176* (2014.01)
*H04N 19/597* (2014.01)

(52) U.S. Cl.
CPC ......... *H04N 19/105* (2014.11); *H04N 19/176* (2014.11); *H04N 19/597* (2014.11)

(56) References Cited

FOREIGN PATENT DOCUMENTS

| CN | 103873867 | 6/2014 |
| CN | 104754359 | 7/2015 |

\* cited by examiner

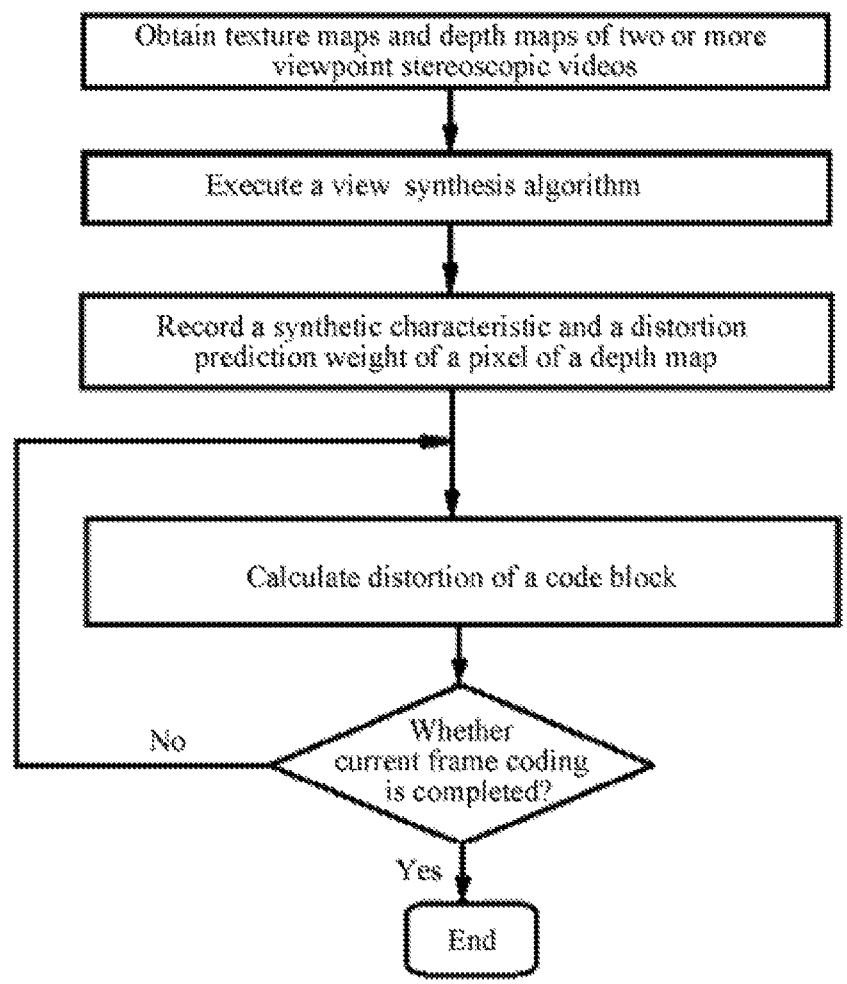

METHOD FOR PREDICTING DEPTH MAP CODING DISTORTION OF TWO-DIMENSIONAL FREE VIEWPOINT VIDEO

CROSS REFERENCE TO RELATED APPLICATIONS

This application is a continuation application of PCT/CN2015/099210, filed on Dec. 28, 2015. The contents of PCT/CN 2015/099210 are all hereby incorporated by reference.

BACKGROUND

Field

The present application relates to computer visual technologies and the video coding field, and in particular, to a method for predicting depth map coding distortion of a two-dimensional free viewpoint video.

Related Arts

A free viewpoint video collects a video of a target scenario from multiple viewpoints by using a collection end, and presents a video of any viewpoint of the target scenario to a user after depth map estimation, coding, transmission, decoding, and viewpoint synthesis, so that the user obtains free visual experience, and the free viewpoint video is considered as the direction of next-generation video communication. The moving pictures experts group (MPEG) and the video coding experts group (VCEG) have developed a video coding standard: high efficiency video coding (HEVC). Compared with H.264, the project greatly improves the coding compression performance, and on such basis, the HEVC is extended to 3D-HEVC for 3D video coding.

In the 3D-HEVC, the format of "multi-viewpoint video+depth map" is used for coding to represent 3D video data, where the depth map represents the distance between an object in the scenario and a camera. By using decoded texture videos and depth videos, videos, which are observed in any other viewpoint, of the target scenario can be synthesized, and projected on a display. As geometric depth information of texture data, depth map data are used to transform texture pixels of a to-be-coded viewpoint into a synthesized viewpoint, so as to obtain a transformation image, and on such basis, operations such as interpolation, hole filling, and inpainting are respectively performed on multiple transformed images obtained by transforming the reference viewpoints to target viewpoints, and then the transformed images are fused. Therefore, to ensure relatively good quality of a synthesized view, it is very important to control coding distortion of the depth map. To control distortion of the depth map so as to reduce the distortion of the synthesized view in the depth map coding process, coding modes and parameters are selected by means of rate-distortion optimization. The Rate-distortion optimization problem is a Lagrange optimization problem, that is, selecting a coding mode or parameter that can make $D+\lambda \cdot R$ minimum. D represents distortion obtained by using a depth map distortion calculation method after the current block is coded by a coding mode or a set of parameters; R represents the number of bits consumed by coding the current block by a coding mode or a set of parameters; and $\lambda$, is a Lagrange multiplier.

Conventional distortion calculation methods are widely used in video coding, such as sum of squared differences (SSD) and sum of absolute differences (SAD), which are first used in depth map distortion calculation. The principles of such methods are simple and are easy to implement by hardware, but the effect of depth map distortion on the synthesized view is not considered, and therefore the overall quality of the synthesized view cannot be ensured. The scholars further provide a depth map distortion prediction method based on a synthesized view distortion change (SVDC). By executing the view synthesis algorithm, distortion, caused by depth map coding, of the synthesized view is calculated to calculate the depth map distortion, such as the SVDC. Such methods can effectively ensure the quality of the synthesized view, but have a huge amount of calculation, and are especially disadvantageous to the application of real-time systems. Therefore, the scholars further provide a depth map distortion prediction method based on synthesized view distortion estimation, that is, a method for predicting depth map distortion by estimating distortion, caused by depth map coding, of the synthesized view, such as view synthesis distortion (VSD). Such methods properly balance the coding complexity and compression performance, but the accuracy of the existing estimation models is limited, and the models are all based on one-dimensional free viewpoint videos, and the extension thereof for two-dimensional free viewpoint videos needs to be researched.

SUMMARY

The present application provides a method for predicting depth map coding distortion of a two-dimensional free viewpoint video, so as to avoid repeated executions of a synthesis algorithm during the depth map coding process and improve the accuracy of the method for predicting depth map coding distortion of a two-dimensional free viewpoint video, and also greatly reduce the calculation complexity of the depth map coding of free viewpoint videos.

The technical problem of the present application is resolved by using the following technical solutions.

A method for predicting depth map coding distortion of a two-dimensional free viewpoint video, including the following steps:

A1: inputting sequences of texture maps and depth maps of two or more viewpoint stereoscopic videos, where viewpoint positions are uniformly distributed in one dimension;

A2: by using texture maps and depth maps of a current to-be-coded viewpoint and adjacent viewpoints thereof, and by using a view synthesis algorithm, synthesizing a texture map of a first intermediate viewpoint of the current to-be-coded viewpoint and a first adjacent viewpoint, and synthesizing a texture map of a second intermediate viewpoint of the current to-be-coded viewpoint and a second adjacent viewpoint, where the first adjacent viewpoint is adjacent to the current to-be-coded viewpoint in a distribution direction of the viewpoint positions, and the second adjacent viewpoint is adjacent to the current to-be-coded viewpoint in a direction perpendicular to the distribution direction of the viewpoint positions;

A3: recording a synthetic characteristic of each pixel in the depth map of the current to-be-coded viewpoint by using the texture map of the first intermediate viewpoint and the texture map of the second intermediate viewpoint in step A2, and generating a corresponding distortion prediction weight; and A4: according to the synthetic characteristic and the corresponding distortion prediction weight of each pixel in the depth map of the current to-be-coded viewpoint in step A3, respectively calculating to obtain distortion of each pixel in a code block of the depth map of the current to-be-coded viewpoint by using a coding pixel distortion prediction model of each pixel, and respectively summing in different directions to obtain a first synthetic distortion sum in the distribution direction of the viewpoint positions and a second synthetic distortion sum in the direction perpendicular to the distribution direction of the viewpoint positions caused by the distortion of each pixel in the code block, averaging the first synthetic distortion sum and the second synthetic distortion sum to obtain a two-dimensional free viewpoint video distortion estimated value caused by each pixel in the code block, and summing the two-dimensional free viewpoint video distortion estimated values, and outputting total distortion of the code block of the depth map of the current to-be-coded viewpoint.

Preferably:

the pixel is a non-exposed point, a forward interpolation point, a weighted interpolation point, a front dual-hole point, or a point of a mixed type, and the synthetic characteristic and the corresponding distortion prediction weight are determined in the following manner:

the non-exposed point refers to that none of adjacent intervals of pixels of the texture map corresponding to pixels of the depth map is exposed in a viewpoint synthesis result; the distortion prediction weight of the non-exposed point is w1, w1=0, and the synthetic characteristic is k1, k1=0;

the forward interpolation point refers to that during viewpoint synthesis, the adjacent intervals of the pixels of the texture map corresponding to the pixels of the depth map are all interpolation areas after transformation, and are displayed as a foreground when two transformation images are fused; the distortion prediction weight of the forward interpolation point is w2, w2=1, and the synthetic characteristic is k2, k2=1;

the weighted interpolation point refers to that during viewpoint synthesis, the adjacent intervals of the pixels of the texture map corresponding to the pixels of the depth map are all interpolation areas after transformation, and weighting and summation are performed on the adjacent intervals when the two transformation images are fused; the distortion prediction weight of the weighted interpolation point is w3, 0≤w3≤1, and the synthetic characteristic is k3, k3=1;

the front dual-hole point refers to that during viewpoint synthesis, the adjacent intervals of the pixels of the texture map corresponding to the pixels of the depth map are all hole filling areas after transformation, and are displayed as a foreground when the two transformation images are fused; the distortion prediction weight of the front dual-hole point is w4, w4=1, and the synthetic characteristic is k4, k4=2;

the point of a mixed type refers to a mixture of any two of the non-exposed point, the forward interpolation point, the weighted interpolation point, or the front dual-hole point;

during viewpoint synthesis, two synthetic characteristics and two distortion prediction weights of the adjacent intervals of the pixels of the texture map corresponding to the pixels of the depth map are all recorded, where when the texture map of the first intermediate viewpoint is synthesized, the adjacent intervals refer to intervals between pixels of the texture map of the current to-be-coded viewpoint and adjacent pixels thereof in the distribution direction of the viewpoint positions; and when the texture map of the second intermediate viewpoint is synthesized, the adjacent intervals refer to intervals between the pixels of the texture map of the current to-be-coded viewpoint and the adjacent pixels thereof in the direction perpendicular to the distribution direction of the viewpoint positions.

The coding pixel distortion prediction model of each pixel is as follows: when the pixel is the non-exposed point, a distortion calculation formula is:

$$D_{syn} = w1 \quad (1)$$

when the pixel is the forward interpolation point, the distortion calculation formula is:

$$D_{syn} = |w2 \cdot [(S_D - S'_D)(S'_{T,n-1} - S'_{T,n+1})]^2| \quad (2)$$

when the pixel is the weighted interpolation point, the distortion calculation formula is:

$$D_{syn} = |w3 \cdot [(S_D - S'_D)(S'_{T,n-1} - S'_{T,n+1})]^2| \quad (3)$$

when the pixel is the front dual-hole point, the distortion calculation formula is:

when the current to-be-coded viewpoint is on the left side of the first intermediate viewpoint or below the second intermediate viewpoint, the distortion calculation formula is:

$$D_{syn} = |w4 \cdot 4[(S_D - S'_D)(S'_{T,n} - S'_{T,n+1})]^2| \quad (4)$$

when the current to-be-coded viewpoint is on the right side of the first intermediate viewpoint of a synthesized viewpoint or above the second intermediate viewpoint of the synthesized viewpoint, the distortion calculation formula is:

$$D_{syn} = |w4 \cdot 4[(S_D - S'_D)(S'_{T,n} - S'_{T,n-1})]^2| \quad (5)$$

when the pixel is the point of a mixed type, according to two types of mixture, respectively calculating distortion according to the coding pixel distortion prediction models of the two types of the mixture, and then obtaining an average value as distortion of the pixel, where $S_D$ is an original depth map pixel value, $S'_D$ is a pixel value of a depth map reestablished after coding, $S'_{T,n}$ represents a value of a pixel that is corresponding to a current depth map pixel and that is in a reestablished viewpoint texture map, $S'_{T,n-1}$ and $S'_{T,n+1}$ respectively represent values of adjacent pixels of the pixel that is corresponding to the current depth map pixel and that is in the reestablished viewpoint texture map, w1, w2, w3, and w4 are distortion prediction weights, and n is a horizontal coordinate or a longitudinal coordinate of each pixel of a current to-be-coded depth map. That none of adjacent intervals of pixels of the texture map corresponding to pixels of the depth map is exposed in a viewpoint synthesis result refers to that: the adjacent intervals are blocked after transformation; or the adjacent intervals are the interpolation areas after transformation, and are covered when the two transformation images are fused; or the adjacent intervals are the hole filling areas after transformation, and when the two transformation images are fused, are covered by a non-hole area in another transformation image; or the adjacent intervals are both hole filling areas in the transformation images, and when the two transformation images are fused, are covered by a background.

The view synthesis algorithm in step A2 uses any depth based image rendering view synthesis algorithm.

Beneficial effects of the embodiments include: in the embodiments, before depth map coding of each frame, viewpoint synthesis is executed at least twice; synthetic characteristics and distortion prediction weights of pixels of a depth map of a current to-be-coded viewpoint are obtained, so as to respectively perform mapping to generate coding distortion prediction models of the pixels, thereby estimating total distortion. The method of the embodiments more reflects distortion, caused by damaged compression of the depth map, of a synthesized view, and also avoids repeated executions of the synthesis algorithm when different coding modes and coding parameters are selected, so that the calculation complexity of the depth map coding of free viewpoint videos is extremely reduced when the compression performance is ensured, thereby obviously improving the accuracy of the method for predicting depth sequence coding distortion of a two-dimensional free viewpoint video.

BRIEF DESCRIPTION OF THE DRAWINGS

The present application will become more fully understood from the detailed description given herein below for illustration only, and thus are not limitative of the present application, and wherein:

FIGURE is a flowchart of a method for predicting depth map coding distortion of a two-dimensional free viewpoint video according to an embodiment of the present application.

DETAILED DESCRIPTION

The present application is further described below with reference to the accompanying drawings and some embodiments.

The present application provides a method for predicting depth map coding distortion of a two-dimensional free viewpoint video. As shown in FIGURE, the method mainly includes the following steps.

First, texture maps and depth maps of two or more viewpoint stereoscopic videos are obtained.

Then, a view synthesis algorithm is executed.

Meanwhile, a synthetic characteristic and a distortion prediction weight of a current depth map pixel are recorded.

Next, distortion of a code block is calculated.

Finally, it is determined whether current frame coding is completed; if the current frame coding is completed, the process is ended, and if the current frame coding is not completed, the foregoing step of calculating the distortion of the code block is returned to until the current frame coding is completed.

In this embodiment of present application, a distribution direction of viewpoint positions is defined as a horizontal direction. "Left", "right", and "horizontal coordinate" all refer to parameters in the horizontal direction; a direction perpendicular to the distribution direction of the viewpoint positions is defined as a vertical direction, and "up", "down", and "longitudinal coordinate" all refer to parameters in the vertical direction.

Preferably, the present application is described in detail below.

A method for predicting depth map coding distortion of a two-dimensional free viewpoint video includes the following steps.

A1: inputted sequences of two or more viewpoint stereoscopic videos are video sequences collected by using a camera or obtained by using a computer tool with unlimited data format, where the sequences include texture maps and corresponding depth maps of a plurality of viewpoints, and viewpoint positions are uniformly distributed in one dimension.

A2: by using texture maps and depth maps of a current to-be-coded viewpoint and adjacent viewpoints thereof, executing a view synthesis algorithm, and in a horizontal direction, synthesizing texture maps of first intermediate viewpoints H1 and H2 of the current to-be-coded viewpoint and viewpoints that are adjacent to the current to-be-coded viewpoint in the horizontal direction, where if the current to-be-coded viewpoint has only an adjacent left viewpoint or an adjacent right viewpoint in the horizontal direction (in cases where the pixel is on edges), only H1 or H2 is synthesized, and in a vertical direction, synthesizing texture maps of second intermediate viewpoints V1 and V2 of the current to-be-coded viewpoint and viewpoints that are adjacent to the current to-be-coded viewpoint in the vertical direction, where similarly, if the current to-be-coded viewpoint has only an adjacent lower viewpoint or an adjacent upper viewpoint in the vertical direction (in cases where the pixel is on edges), only V1 or V2 is synthesized, and in this example, the view synthesis algorithm is executed for four times to synthesize the texture maps of the first intermediate viewpoints H1 and H2 and the second intermediate viewpoints V1 and V2, and the view synthesis algorithm may use a depth based image rendering algorithm, including transformation, interpolation, hole filling, and module fusion.

A3: according to use conditions of intervals between pixels of the texture map of the to-be-coded viewpoint (for synthesis in the horizontal direction, the intervals are between the current pixel and horizontally adjacent pixels, and for synthesis in the vertical direction, the intervals are between the current pixel and vertically adjacent pixels) in the transformation, interpolation, hole filling, and module fusion of the view synthesis algorithm of A2 (that is, the pixel is which one of a non-exposed point, a forward interpolation point, a weighted interpolation point, a front dual-hole point, or a point of a mixed type), determining and recording synthetic characteristics $K_{H1}$, $K_{H2}$, $K_{V1}$, and $K_{V2}$ and corresponding distortion prediction weights $W_{H1}$, $W_{H2}$, $W_{V1}$, and $W_{V2}$ of pixels in the depth map of the current to-be-coded viewpoint, where the synthetic characteristics and the corresponding distortion prediction weights are determined in the following manner.

The non-exposed point refers to that none of adjacent intervals of the pixels of the texture map corresponding to pixels of the depth map (for synthesis in the horizontal direction, the intervals are intervals between the pixels of the texture map of the current to-be-coded viewpoint and left and right adjacent pixels thereof, and for synthesis in the vertical direction, the intervals are intervals between the pixels of the texture map of the current to-be-coded viewpoint and upper and lower adjacent pixels thereof, similarly hereinafter) is exposed in a viewpoint synthesis result. Specific conditions include: the adjacent intervals are blocked after transformation; the adjacent intervals are interpolation areas after transformation, and are covered when left and right transformation images are fused; the adjacent intervals are hole filling areas after transformation, and when the two transformation images are fused, are covered by a non-hole area in another transformation image; and the adjacent intervals are both hole filling areas in the two transformation images, and when the two transformation images are fused, are covered by a background. The distortion prediction weight of the non-exposed point is w1, w1=0, and the synthetic characteristic is k1, k1=0.

The forward interpolation point refers to that during viewpoint synthesis, the adjacent intervals of the pixels of the texture map corresponding to the pixels of the depth map are all interpolation areas after transformation, and are displayed as a foreground when left and right transformation images are fused. The distortion prediction weight of the forward interpolation point is w2, w2=1, and the synthetic characteristic is k2, k2=1.

The weighted interpolation point refers to that during viewpoint synthesis, the adjacent intervals of the pixels of the texture map corresponding to the pixels of the depth map are all interpolation areas after transformation, and weighting and summation are performed on the adjacent intervals when the two transformation images are fused. The distortion prediction weight is weighted weight w3, 0<w3<1, and the synthetic characteristic is k3, k3=1.

The front dual-hole point refers to that during viewpoint synthesis, the adjacent intervals of the pixels of the texture map corresponding to the pixels of the depth map are all hole filling areas after transformation, and are displayed as a foreground when the two transformation images are fused. The distortion prediction weight of the front dual-hole point is w4, w4=1, and the synthetic characteristic is k4, k4=2.

The point of a mixed type refers to a mixture of any two of the non-exposed point, the forward interpolation point, the weighted interpolation point, or the front dual-hole point; during viewpoint synthesis, two synthetic characteristics and two distortion prediction weights of the adjacent intervals of the pixels of the texture map corresponding to the pixels of the depth map are all recorded. If the pixels of the texture map corresponding to the pixels of the depth map have only a left interval or a right interval (in cases where the pixels are on edges), then the synthetic characteristics and the distortion prediction weights of the pixels of the depth map are determined only according to a use condition of the interval. If the pixels of the texture map corresponding to the pixels of the depth map have only a left interval or a right interval (in cases where the pixels are on edges), or have only an upper interval or a lower interval (in cases where the pixels are on edges), then the synthetic characteristics and the distortion prediction weights of the pixels of the depth map are determined only according to a use condition of the interval.

A4: in the depth map coding process, for one pixel of a current code block, respectively mapping the pixel into coding pixel distortion prediction models by using the synthetic characteristic and the distortion prediction weight of the pixel obtained in A3, where each distortion prediction model is as follows:

A distortion calculation formula of the non-exposed point is:

$$D_{syn} = w1 \quad (1)$$

A distortion calculation formula of the forward interpolation point is:

$$D_{syn} = |w2 \cdot [(S_D - S'_D)(S'_{T,n-1} - S'_{T,n+1})]^2| \quad (2)$$

A distortion calculation formula of the weighted interpolation point is:

$$D_{syn} = |w3 \cdot [(S_D - S'_D)(S'_{T,n-1} - S'_{T,n+1})]^2| \quad (3)$$

For the front dual-hole point, if the current to-be-coded viewpoint is on the left side of the first intermediate viewpoint or below the second intermediate viewpoint (on the left side of the first intermediate viewpoint for horizontal synthesis and below the second intermediate viewpoint for vertical synthesis), the distortion calculation formula is:

$$D_{syn} = |w4 \cdot 4[(S_D - S'_D)(S'_{T,n} - S'_{T,n+1})]^2| \quad (4)$$

if the current to-be-coded viewpoint is on the right side of the first intermediate viewpoint or above the second intermediate viewpoint (on the right side of the first intermediate viewpoint for horizontal synthesis and above the second intermediate viewpoint for vertical synthesis), the distortion calculation formula is:

$$D_{syn} = |w4 \cdot 4[(S_D - S'_D)(S'_{T,n} - S'_{T,n-1})]^2| \quad (5)$$

For the point of a mixed type, according to two types of mixture, distortion is respectively calculated according to the foregoing models, and then an average value is obtained as distortion of the pixel.

In the foregoing formulas, $S_D$ is an original depth map pixel value, $S'_D$ is a pixel value of a depth map reestablished after coding, $S'_{T,n-1}$ and $S'_{T,n+1}$ are respectively values of adjacent pixels of the pixel that is corresponding to the current depth map pixel and that is in the reestablished viewpoint texture map (for synthesis in the horizontal direction, $S'_{T,n-1}$ and $S'_{T,n+1}$ are respectively values of adjacent left and right pixels of the pixel that is corresponding to the current depth map pixel and that is in the reestablished viewpoint texture map; and for synthesis in the vertical direction, $S'_{T,n-1}$ and $S'_{T,n+1}$ are respectively values of adjacent upper and lower pixels of the pixel that is corresponding to the current depth map pixel and that is in the reestablished viewpoint texture map), w1, w2, w3, and w4 are distortion prediction weights, and n is a horizontal coordinate or a longitudinal coordinate of each pixel of a current to-be-coded depth map.

According to the foregoing models, distortion of each pixel in the code block of the depth map of the current to-be-coded viewpoint is obtained by calculation, and summation is respectively performed in the horizontal direction and the vertical direction to calculate horizontal synthetic distortion sums $D_{H1}$ and $D_{H2}$ and vertical synthetic distortion sums $D_{V1}$ and $D_{V2}$ caused by distortion of the pixel, and then $D_{H1}$, $D_{H2}$, $D_{V1}$, and $D_{V2}$ are averaged to obtain a synthetic distortion estimated value caused by distortion of the pixel, and summation is performed on distortion estimated values of the pixels to output total distortion of the current code block, and based on such distortion, an optimal coding mode and coding parameter can be selected by means of rate-distortion optimization. For example, a coding mode or parameter that can make $D+\lambda \cdot R$ minimum is selected. D represents distortion obtained by using a depth map distortion calculation method (for example, the foregoing distortion prediction method) after the current block is coded by a coding mode or a set of parameters; R represents the number of bits consumed by coding the current block by a coding mode or a set of parameters; and $\lambda$, is a Lagrange multiplier.

In this embodiment of the present application, before depth map coding of each frame, viewpoint synthesis is executed for four times to synthesize intermediate viewpoints of the current to-be-coded viewpoint and adjacent viewpoints. In this process, a use condition of intervals of current pixels in the synthesis algorithm is recorded to obtain the synthetic characteristic and the distortion prediction weight of each pixel of the current to-be-coded depth map, thereby performing mapping to generate a coding distortion prediction model. Then coding of the current depth map is performed, and when each block is coded, different distortion calculation models are used to calculate distortion for different pixels, so as to obtain distortion of the code block of the depth map. The distortion calculation method more reflects distortion, caused by damaged compression of the depth map, of a synthesized view, and also avoids repeated executions of the view synthesis algorithm when different coding modes and coding parameters are selected, so that the calculation complexity is extremely reduced when the compression performance is ensured.

Although the present application is described above in further detail through specific embodiments, the present application is not limited to the specific embodiments. It should be understood by persons in the art that any equivalent replacement or obvious transformation that is made without departing from the spirit of the present application and has the same performance or usage shall fall within the protection scope of the present application.

What is claimed is:

1. A method for predicting depth map coding distortion of a two-dimensional free viewpoint video, comprising the following steps:

A1: inputting sequences of texture maps and depth maps of two or more viewpoint stereoscopic videos, wherein viewpoint positions are uniformly distributed in one dimension;

A2: by using texture maps and depth maps of a current to-be-coded viewpoint and adjacent viewpoints thereof, and by using a view synthesis algorithm, synthesizing a texture map of a first intermediate viewpoint of the current to-be-coded viewpoint and a first adjacent viewpoint, and synthesizing a texture map of a second intermediate viewpoint of the current to-be-coded viewpoint and a second adjacent viewpoint, wherein the first adjacent viewpoint is adjacent to the current to-be-coded viewpoint in a distribution direction of the viewpoint positions, and the second adjacent viewpoint is adjacent to the current to-be-coded viewpoint in a direction perpendicular to the distribution direction of the viewpoint positions;

A3: recording a synthetic characteristic of each pixel in the depth map of the current to-be-coded viewpoint by using the texture map of the first intermediate viewpoint and the texture map of the second intermediate viewpoint in step A2, and generating a corresponding distortion prediction weight; and A4: according to the synthetic characteristic and the corresponding distortion prediction weight of each pixel in the depth map of the current to-be-coded viewpoint in step A3, respectively calculating to obtain distortion of each pixel in a code block of the depth map of the current to-be-coded viewpoint by using a coding pixel distortion prediction model of each pixel, and respectively summing in different directions to obtain a first synthetic distortion sum in the distribution direction of the viewpoint positions and a second synthetic distortion sum in the direction perpendicular to the distribution direction of the viewpoint positions caused by the distortion of each pixel in the code block, averaging the first synthetic distortion sum and the second synthetic distortion sum to obtain a two-dimensional free viewpoint video distortion estimated value caused by each pixel in the code block, and summing the two-dimensional free viewpoint video distortion estimated values, and outputting total distortion of the code block of the depth map of the current to-be-coded viewpoint.

2. The method for predicting depth map coding distortion of a two-dimensional free viewpoint video according to claim 1, wherein
the pixel is a non-exposed point, a forward interpolation point, a weighted interpolation point, a front dual-hole point, or a point of a mixed type, and the synthetic characteristic and the corresponding distortion prediction weight are determined in the following manner:

the non-exposed point refers to that none of adjacent intervals of pixels of the texture map corresponding to pixels of the depth map is exposed in a viewpoint synthesis result;

the distortion prediction weight of the non-exposed point is w1, w1=0, and the synthetic characteristic is k1, k1=0;

the forward interpolation point refers to that during viewpoint synthesis, the adjacent intervals of the pixels of the texture map corresponding to the pixels of the depth map are all interpolation areas after transformation, and are displayed as a foreground when two transformation images are fused; the distortion prediction weight of the forward interpolation point is w2, w2=1, and the synthetic characteristic is k2, k2=1;

the weighted interpolation point refers to that during viewpoint synthesis, the adjacent intervals of the pixels of the texture map corresponding to the pixels of the depth map are all interpolation areas after transformation, and weighting and summation are performed on the adjacent intervals when the two transformation images are fused; the distortion prediction weight of the weighted interpolation point is w3, 0<w3<1, and the synthetic characteristic is k3, k3=1;

the front dual-hole point refers to that during viewpoint synthesis, the adjacent intervals of the pixels of the texture map corresponding to the pixels of the depth map are all hole filling areas after transformation, and are displayed as a foreground when the two transformation images are fused; the distortion prediction weight of the front dual-hole point is w4, w4=1, and the synthetic characteristic is k4, k4=2;

the point of a mixed type refers to a mixture of any two of the non-exposed point, the forward interpolation point, the weighted interpolation point, or the front dual-hole point; during viewpoint synthesis, two synthetic characteristics and two distortion prediction weights of the adjacent intervals of the pixels of the texture map corresponding to the pixels of the depth map are all recorded, wherein when the texture map of the first intermediate viewpoint is synthesized, the adjacent intervals refer to intervals between pixels of the texture map of the current to-be-coded viewpoint and adjacent pixels thereof in the distribution direction of the viewpoint positions; and when the texture map of the second intermediate viewpoint is synthesized, the adjacent intervals refer to intervals between the pixels of the texture map of the current to-be-coded viewpoint and the adjacent pixels thereof in the direction perpendicular to the distribution direction of the viewpoint positions.

3. The method for predicting depth map coding distortion of a two-dimensional free viewpoint video according to claim 2, wherein the coding pixel distortion prediction model of each pixel is as follows:

when the pixel is the non-exposed point, a distortion calculation formula is:

$$D_{syn} = w1 \qquad (1)$$

when the pixel is the forward interpolation point, the distortion calculation formula is:

$$D_{syn} = |w2 \cdot [(S_D - S'_D)(S'_{T,n-1} - S'_{T,n+1})]^2| \qquad (2)$$

when the pixel is the weighted interpolation point, the distortion calculation formula is:

$$D_{syn} = |w3 \cdot [(S_D - S'_D)(S'_{T,n-1} - S'_{T,n+1})]^2| \qquad (3)$$

when the pixel is the front dual-hole point, the distortion calculation formula is:

when the current to-be-coded viewpoint is on the left side of the first intermediate viewpoint or below the second intermediate viewpoint, the distortion calculation formula is:

$$D_{syn}=|w4\cdot 4[(S_D-S'_D)(S'_{T,n}-S'_{T,n+1})]^2| \quad (4)$$

when the current to-be-coded viewpoint is on the right side of the first intermediate viewpoint of a synthesized viewpoint or above the second intermediate viewpoint of the synthesized viewpoint, the distortion calculation formula is:

$$D_{syn}=|w4\cdot 4[(S_D-S'_D)(S'_{T,n}-S'_{T,n-1})]^2| \quad (5)$$

when the pixel is the point of a mixed type, according to two types of mixture, respectively calculating distortion according to the coding pixel distortion prediction models of the two types of the mixture, and then obtaining an average value as distortion of the pixel, wherein $S_D$ is an original depth map pixel value, $S'_D$ is a pixel value of a depth map reestablished after coding, $S'_{T,n}$ represents a value of a pixel that is corresponding to a current depth map pixel and that is in a reestablished viewpoint texture map, $S'_{T,n-1}$ and $S'_{T,n+1}$ respectively represent values of adjacent pixels of the pixel that is corresponding to the current depth map pixel and that is in the reestablished viewpoint texture map, w1, w2, w3, and w4 are distortion prediction weights, and n is a horizontal coordinate or a longitudinal coordinate of each pixel of a current to-be-coded depth map.

4. The method for predicting depth map coding distortion of a two-dimensional free viewpoint video according to claim 2, wherein that none of adjacent intervals of pixels of the texture map corresponding to pixels of the depth map is exposed in a viewpoint synthesis result refers to that: the adjacent intervals are blocked after transformation; or the adjacent intervals are the interpolation areas after transformation, and are covered when the two transformation images are fused; or the adjacent intervals are the hole filling areas after transformation, and when the two transformation images are fused, are covered by a non-hole area in another transformation image; or the adjacent intervals are both hole filling areas in the transformation images, and when the two transformation images are fused, are covered by a background.

5. The method for predicting depth map coding distortion of a two-dimensional free viewpoint video according to claim 3, wherein that none of adjacent intervals of pixels of the texture map corresponding to pixels of the depth map is exposed in a viewpoint synthesis result refers to that: the adjacent intervals are blocked after transformation; or the adjacent intervals are the interpolation areas after transformation, and are covered when the two transformation images are fused; or the adjacent intervals are the hole filling areas after transformation, and when the two transformation images are fused, are covered by a non-hole area in another transformation image; or the adjacent intervals are both hole filling areas in the transformation images, and when the two transformation images are fused, are covered by a background.

6. The method for predicting depth map coding distortion of a two-dimensional free viewpoint video according to claim 1, wherein the view synthesis algorithm in step A2 uses any depth based image rendering view synthesis algorithm.

* * * * *